No. 827,666. PATENTED JULY 31, 1906.
J. E. QUINN.
COMBINED CORD KNOTTER AND CUTTER.
APPLICATION FILED JAN. 21, 1905.
2 SHEETS—SHEET 1.
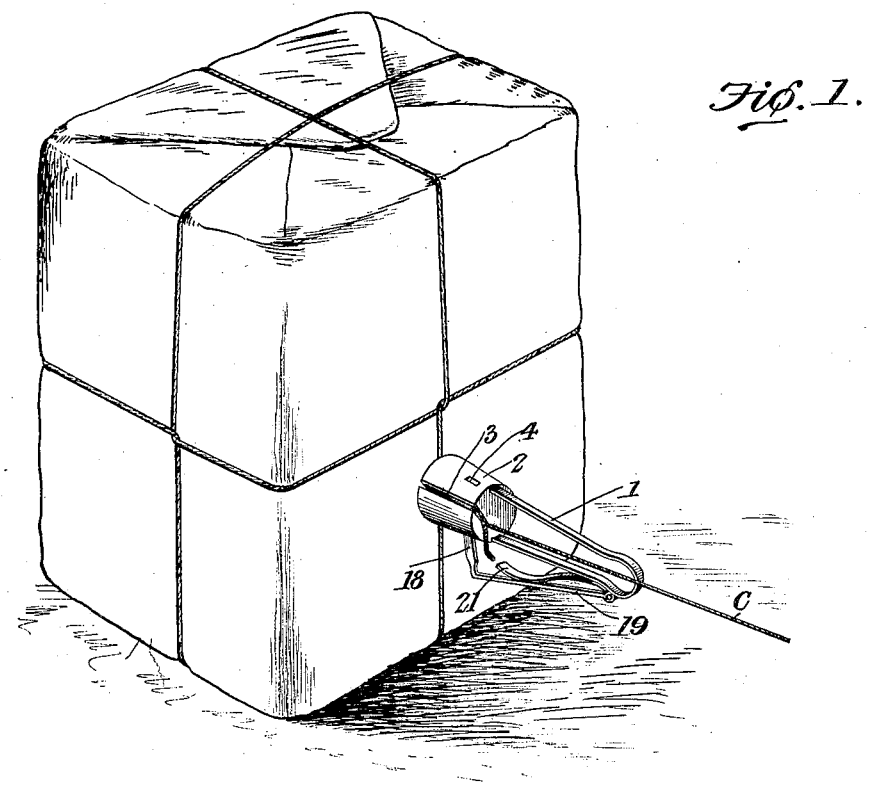
Fig. 1.
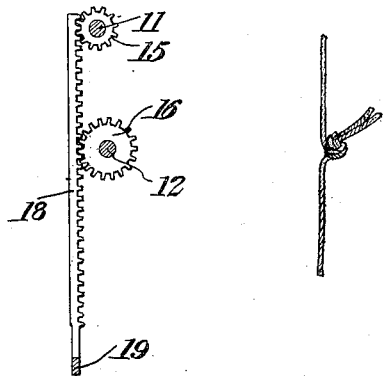
Fig. 7.
Fig. 8.
Witnesses:
John E. Quinn Inventor,
by C. A. Snow & Co.
Attorneys.

No. 827,666. PATENTED JULY 31, 1906.
J. E. QUINN.
COMBINED CORD KNOTTER AND CUTTER.
APPLICATION FILED JAN. 21, 1905.
2 SHEETS—SHEET 2.
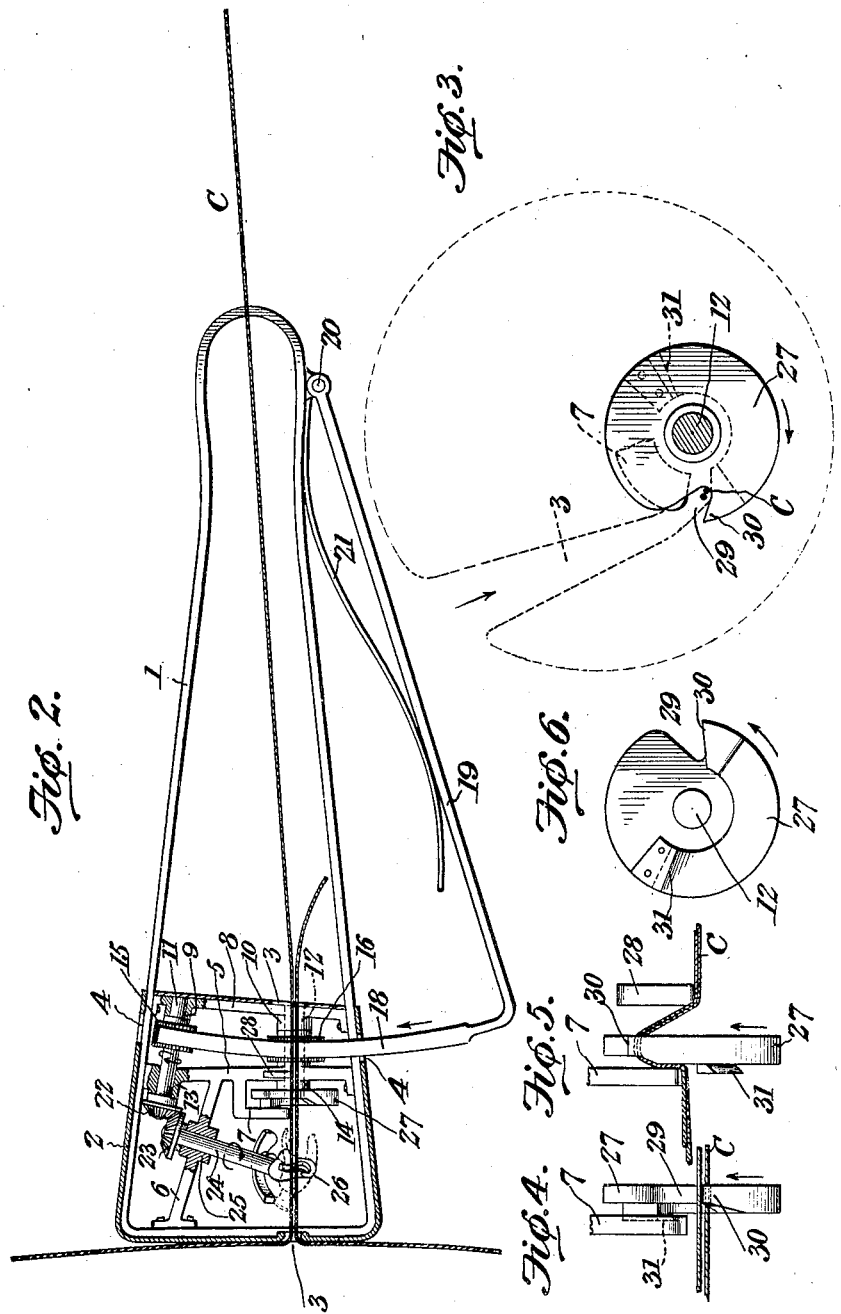
Witnesses:
John E. Quinn, Inventor,
by C. A. Snow & Co.
Attorneys.

UNITED STATES PATENT OFFICE.

JOHN E. QUINN, OF EDGERTON, WISCONSIN.

COMBINED CORD KNOTTER AND CUTTER.

No. 827,666.　　　　Specification of Letters Patent.　　　　Patented July 31, 1906.

Application filed January 21, 1905. Serial No. 242,196.

*To all whom it may concern:*

Be it known that I, JOHN E. QUINN, a citizen of the United States, residing at Edgerton, in the county of Rock and State of Wisconsin, have invented a new and useful Combined Cord Knotter and Cutter, of which the following is a specification.

This invention relates to a combined cord knotter and cutter adapted for mercantile purposes in wrapping bundles.

The object of the invention is to provide an implement of the class described which may be readily operated by one hand and which will be thoroughly effective in drawing the cord around the bundle, tying a knot therein, and severing the cord with practically no waste of material; furthermore, to provide an implement combining the above characteristics which shall be simple in construction, thoroughly efficient and durable in use, which may be readily and cheaply manufactured, and in which the parts shall be so constructed and combined as to reduce liability of damage or breakage to a minimum.

With the above and other objects in view, as will appear as the nature of the invention is better understood, the same consists in the novel construction and combination of parts of a combined cord knotter and cutter for mercantile purposes, as will be hereinafter fully described and claimed.

In the accompanying drawings, forming a part of this specification, and in which like characters of reference indicate corresponding parts, Figure 1 is a view in perspective exhibiting the manner in which a bundle is tied with the implement of this invention. Fig. 2 is a view in elevation, partly in section, of the implement. Fig. 3 is an end view of the implement, on an enlarged scale, showing more particularly the combined cutter and tension device, the casing housing the operative mechanism being indicated by dotted lines. Fig. 4 is a view in side elevation showing the position of the tension device before the operation of the knotter takes place. Fig. 5 is a similar view showing the manner in which the cord is held under tension during the operation of the knotter. Fig. 6 is a view in side elevation of the combined knife and tension device. Fig. 7 is a detail view exhibiting more particularly the proportions between the gears and the rack-bar that operate the knotter and tension device and knife. Fig. 8 is a detail view exhibiting the knot tied by the implement.

The implement comprises a handle 1, which is herein shown as a hollow structure throughout a greater portion of its length and is preferably made of a piece of flat metal bent to the appropriate shape and to one end of which is secured a casing 2, preferably of metal, and provided in one side and both ends with a slit or cord-guide 3 and with a pair of oppositely-disposed orifices 4. Although the handle 1 is herein shown as a hollow structure, it is to be understood that it may be closed by plates attached to both sides, and as this will be obvious detailed illustration thereof is deemed unnecessary.

Mounted within the casing are two frames for supporting the cord-knotter and the tension device and knife. One of these frames comprises a member 5, which extends transversely of the casing and is secured at its terminals to a part of the handle, and an inclined extension 6, having its free end also secured to the handle. The member 5 is further provided with an angular extension, one member 7 of which extends parallel with the member 5. The second frame 8 has its terminals secured to the handle and is provided with two bearings 9 and 10, in which are journaled one end each of two shafts 11 and 12, the other end portions of which are journaled in bearings 13 and 14, carried by the frame member 5. Mounted on the shafts 11 and 12 intermediate of their ends are pinions 15 and 16, respectively, the former of which is the smaller, as shown in Fig. 7, and these pinions are engaged by a curved rack 18, carried by or formed integral with the arm 19, pivoted at 20, near the outer end of the handle, a leaf-spring 21, bearing against the inner side of the arm 19, operating to retain the same normally in the position shown in Fig. 2.

To one end of the shaft 11 is secured a beveled gear 22, which engages with a similar gear 23, carried by a shaft 24, mounted in a bearing 25, carried by the frame member 6, the free or depending end of the shaft 24 having combined with it a knotter 26, such as usually employed on grain-binders, and operated in the same manner as that shown in the patent of Isaac E. McElroy, No. 796,926, August 8, 1905.

The shaft 12 carries a combined tension device and knife 27, which works between the frame members 5 and 7, the depending end of the frame member 7, in conjunction with a similar part 28 projecting outward from the frame 5, serving as a guide for the cord C to prevent it lifting when the tension device is operated. The tension device comprises a disk having on one side a recess 29, one wall of which forms a cord-engaging beak 30, and upon one side of the disk is secured a knife 31, which coöperates with the under side of the frame member 7 in severing the cord.

In the operation of the device the cord is passed around the bundle as many times as desired, and the operator then grasps the implement in his right hand and with his left passes two lengths of the cord between the cord-guides 3, thereby bringing the cords under the parts 7 and 28 of the frame 5. The operator then presses the arm 19 upward, whereupon the rack 18 will be moved transversely of the casing through the orifices 4 and imparts simultaneous movement to the shafts 11 and 12, the movement of the first shaft causing the tension device to be moved from the position shown in Fig. 4 to that shown in Fig. 5, thereby clamping the cord between the member 7 of the frame and the face of the disk and holding it firmly against movement. During the time that the tension device is moving to this position the shaft 24 will have completed a sufficient rotation to effect the tying of the knot, and as the cord is held against movement by the tension device 27 any slack necessary in forming the knot will be taken from the cord around the bundle, thereby effecting its proper stretching and causing it to bind sufficiently tight thereon to prevent slipping. By the time that the arm 19 has been moved inward to the limit of its stroke the knife 31 will be brought into engagement with the cord and will sever it, whereupon the arm is released and again assumes its position shown in Fig. 2.

It will be seen from the foregoing description that although the device of this invention is exceedingly simple in construction that it combines in a ready and practical manner all the requisites necessary to the presentation of a thoroughly effective implement and, moreover, that the parts are so constructed and arranged as to reduce liability of injury or wear in use to a minimum.

Having thus described the invention, what is claimed is—

1. In an implement of the class described, a casing, a shaft mounted therein and carrying at one end a cord-knotter and at its other end a miter-gear, a second shaft carrying a pinion and a miter-gear meshing with that of the first shaft, a third shaft carrying a pinion and a combined tension device and knife, and means for simultaneously driving both pinions.

2. In a device of the class described, a casing, a shaft mounted therein and carrying at one end a knotter and at its other end a miter-gear, a second shaft carrying a pinion and a miter-gear meshing with that of the first shaft, a third shaft carrying a pinion of greater size than that of the second shaft and a combined tension device and knife, and a rack-bar engaging the two pinions.

3. In an implement of the class described, the combination with a handle, of a casing provided in its side and both ends with a cord-guide, a shaft journaled in the casing and carrying at one end a cord-knotter arranged in the line of the cord-guide and at its other end a miter-gear, a second shaft carrying a pinion and a miter-gear meshing with that of the first shaft, a third shaft carrying a pinion and a combined tension device and knife, a rack-bar projecting transversely through the casing and engaging the pinions, and a spring-pressed arm for actuating the rack-bar.

4. In an implement of the class described, the combination with a handle, of a casing provided in its side and both ends with a cord-guide, a shaft mounted within the casing and carrying at one end a cord-knotter arranged in the line of the guide and at its other end a miter-gear, a second shaft carrying a pinion and a miter-gear meshing with that of the first shaft, a third shaft carrying a pinion and a combined tension device and knife provided with a cord-engaging beak, stationary members disposed on each side of the tension device and coacting therewith, and a rack-bar engaging the pinions.

5. In an implement of the class described, the combination with a handle, of a casing secured thereto and provided with a lateral cord-guide, frame members secured within the casing, a pair of shafts journaled in the frame, and carrying intermeshing miter-gears, a knotter carried by one of the shafts, a pinion carried by the other shaft, a third shaft carrying a pinion and a combined tension device and knife, a rack-bar meshing with the two pinions, and a spring-pressed arm for actuating the rack-bar.

In testimony that I claim the foregoing as my own I have hereto affixed my signature in the presence of two witnesses.

JOHN E. QUINN.

Witnesses:
H. LIPKE,
FRANK COLLINS.